(12) United States Patent
Sern et al.

(10) Patent No.: US 11,438,356 B2
(45) Date of Patent: Sep. 6, 2022

(54) DEEP EMBEDDED SELF-TAUGHT LEARNING SYSTEM AND METHOD FOR DETECTING SUSPICIOUS NETWORK BEHAVIOURS

(71) Applicant: Ensign InfoSecurity Pte. Ltd, Singapore (SG)

(72) Inventors: Lee Joon Sern, Singapore (SG); Quek Hanyang, Singapore (SG); Chan Jin Hao, Singapore (SG)

(73) Assignee: Ensign InfoSecurity Ptd. Ltd., Singapore (SG)

( * ) Notice: Subject to any disclaimer, the term of this patent is extended or adjusted under 35 U.S.C. 154(b) by 0 days.

(21) Appl. No.: 17/463,927

(22) Filed: Sep. 1, 2021

(65) Prior Publication Data

US 2022/0070195 A1    Mar. 3, 2022

(30) Foreign Application Priority Data

Sep. 1, 2020   (SG) ............................ 10202008469R

(51) Int. Cl.
*H04L 29/06*   (2006.01)
*H04L 9/40*    (2022.01)
(Continued)

(52) U.S. Cl.
CPC ........ *H04L 63/1425* (2013.01); *G06K 9/6256* (2013.01); *G06N 3/08* (2013.01); *H04L 63/145* (2013.01); *H04L 63/1416* (2013.01)

(58) Field of Classification Search
CPC ............. H04L 63/1425; H04L 63/1416; H04L 63/145; G06K 9/6256; G06N 3/08
(Continued)

(56) References Cited

U.S. PATENT DOCUMENTS

2018/0157831 A1*   6/2018   Abbaszadeh .......... G06N 20/00
2018/0165554 A1*   6/2018   Zhang ................... G06N 7/005
(Continued)

FOREIGN PATENT DOCUMENTS

CN      109446804 A        3/2019
CN      110659759 A  *     1/2020    .......... G06N 3/0445
(Continued)

OTHER PUBLICATIONS

Rezvy S. et al., Intrusion detection and classification with autoencoded deep neural network. International Conference on Security for Information Technology and Communications, Feb. 6, 2019, pp. 142-156.

*Primary Examiner* — Badri Narayanan Champakesan
(74) *Attorney, Agent, or Firm* — Sterne, Kessler, Goldstein & Fox P.L.L.C.

(57) ABSTRACT

This document discloses a system and method for detecting and classifying potential malicious network behaviours or characteristics contained within data traffic. In particular, this document discloses a system comprising a data pre-processing module for processing the received data traffic before the processed data traffic is provided to an alert module communicatively connected to the data pre-processing module. The alert module, which comprises a trained autoencoder and a classifier neural network trained via self-taught learning, then determines, based on a set of partially labelled training data, whether potential malicious network behaviours that typically present themselves as network traffic anomalies are contained within the processed data traffic.

20 Claims, 8 Drawing Sheets

(51) Int. Cl.
*G06K 9/62* (2022.01)
*G06N 3/08* (2006.01)

(58) Field of Classification Search
USPC .......................................................... 726/22
See application file for complete search history.

(56) References Cited

U.S. PATENT DOCUMENTS

| | | | |
|---|---|---|---|
| 2019/0058715 A1* | 2/2019 | Abbaszadeh | H04L 63/1416 |
| 2019/0188065 A1* | 6/2019 | Anghel | G06F 11/0778 |
| 2019/0222596 A1* | 7/2019 | Abbaszadeh | G06F 21/554 |
| 2019/0362070 A1* | 11/2019 | Abbaszadeh | G06F 21/554 |
| 2020/0076842 A1* | 3/2020 | Zhou | G06N 3/0454 |
| 2020/0112571 A1* | 4/2020 | Koral | G06N 3/08 |
| 2020/0210808 A1* | 7/2020 | Dong | G06K 9/6268 |
| 2020/0314127 A1* | 10/2020 | Wilson | H04L 41/064 |
| 2020/0364579 A1* | 11/2020 | Misu | G06N 3/0454 |
| 2020/0387818 A1* | 12/2020 | Chan | G06F 17/18 |
| 2021/0058424 A1* | 2/2021 | Chang | G06N 3/088 |
| 2021/0126943 A1* | 4/2021 | Roychowdhury | G06K 9/6256 |
| 2021/0182385 A1* | 6/2021 | Roychowdhury | G06N 3/0454 |
| 2021/0349979 A1* | 11/2021 | Cohen | G06F 21/55 |

FOREIGN PATENT DOCUMENTS

| | | | |
|---|---|---|---|
| CN | 111507385 A | 8/2020 | |
| WO | WO-02073475 A1 * | 9/2002 | G05B 17/02 |

* cited by examiner

DEEP EMBEDDED SELF-TAUGHT LEARNING SYSTEM AND METHOD FOR DETECTING SUSPICIOUS NETWORK BEHAVIOURS

FIELD OF THE INVENTION

This invention relates to a system and method for detecting and classifying potential malicious network behaviours or characteristics contained within data traffic. In particular, this invention relates to a system comprising a data pre-processing module for processing the received data traffic before the processed data traffic is provided to an alert module that is communicatively connected to the data pre-processing module. The alert module, which comprises a trained autoencoder and a classifier neural network trained via self-taught learning on a set of partially labelled training data, then determines if potential malicious network behaviours that typically present themselves as network traffic anomalies are contained within the processed data traffic.

SUMMARY OF PRIOR ART

Cybersecurity threats such as TCP SYN flooding, DNS amplification attacks, Distributed Denial-of-Service (DDoS) attacks, brute force attempts, beaconing attempts, Trojans, key loggers, botnet communications, spam campaigns, network/port scans, and etc. are threats that are faced daily by computer networks. These threats typically result in unusual or uncommon network traffic behaviours. Thus, they are often detected and identified by cybersecurity systems as network anomalies. The detection of such network anomalies remain challenging for a number of reasons. Among the reasons are that such attacks are voluminous and that such attacks may be masked in existing network data as the characteristics of network data are ever changing (i.e. they are dependent on a number of factors, such as the end-user's behaviour, the customer's types of business (e.g., banking, retail), the types of the applications, the location, the time of the day). Such diversity and dynamism limits the application of rule-based systems for the detection of anomalies in network traffic.

Typically, such malicious network behaviours are commonly known in the art to result in anomalous network traffic that can be commonly found residing within part of network communications received by, or occurring between, computer systems. Traditional network anomaly detection mechanisms depend on techniques such as network traffic interception and analysis, or network connection summarization to determine key characteristics of a network connection, such as its source and destination addresses, source and destination ports, protocols, octet sizes and reverse octet sizes, to determine whether network traffic are malicious. Hence, it is useful to note that these characteristics which comprise both numerical and categorical features may be obtained from a router's NetFlow records.

For such an approach, the detection of malicious network behaviours typically depend on the analysis of individual traffic (e.g. NetFlow) records (or a summarization of individual traffic records) to identify known characteristics of network anomalies (based on protocols, ports, octet sizes, etc.) associated with various types of malicious network behaviours. Such approaches are of limited effectiveness since it is not always possible to distinguish anomalous traffic from normal data traffic without also referring to associated traffic records of the past. It has been found that analysing a series of network traffic records typically provides better characterisation of network behaviours to detect malicious activities.

As such, those skilled in the art have proposed that deep learning methods such as recurrent neural networks (RNN) be applied to detect network traffic associated with cyber-threats propagated by, or communicating over, a network connection as deep learning methods are able to handle large volumes of data associated with grouping multiple traffic records together. Also, the large number of model parameters associated with such deep learning neural networks provide them the ability to learn the many variations of network behaviour that may occur.

It has also been proposed that clustering methods based on deep learning autoencoders be used to detect anomalies within network traffic. Autoencoders are able to achieve this as they train themselves by first summarising their inputs to a low dimensional space via the encoder and then reconstructing the inputs from the low dimensional representation via the decoder. While it is often trivial to obtain good reconstructions with plain autoencoders, much effort has been devoted on regularizations to prevent autoencoders from overfitting in order to get good low dimensional representations. However, little attention has been devoted to trying to make sense of the low dimensional representations, which is important for characterising and classifying anomalies, instead of just flagging out an anomaly without any additional context or information for the threat analysts. Typically, the low dimensional representations output by the encoder can be clustered, with each cluster representing a different type of behaviour in the data. Although extremely useful for flagging out anomalous network traffic and thus potential malicious network activities, such methods are unable to make sense of the clusters (i.e. associate each cluster to a type of malicious network behaviour in our case), without the presence of labelled data. Also, when the input to the autoencoder comprises categorical features (such as those obtained from traffic data like NetFlow), the autoencoder may be unable to train itself efficiently as the categorical features would first have to be converted to some form of numerical representation. It has been mentioned that clustering methodologies may be used to flag out anomalies without labelled data but it has not been disclosed in the art how such anomalies may be identified and classified in an autonomous and computationally efficient manner.

For the above reasons, those skilled in the art are constantly striving to come up with a system and method that is capable of detecting and classifying network anomalies using both labelled and unlabelled network data traffic in an efficient and effective manner whereby the network data traffic may comprise both numerical and categorical features.

SUMMARY OF THE INVENTION

The above and other problems are solved and an advance in the art is made by systems and methods provided by embodiments in accordance with the invention.

A first advantage of embodiments of systems and methods in accordance with the invention is that the alert module of the invention is able to train itself to detect and classify various types of potential malicious network behaviours even though fully labelled data is unavailable to train the alert module.

A second advantage of embodiments of systems and methods in accordance with the invention is that the invention is able to continuously monitor data traffic to detect and classify potential malicious network behaviours occurring between source destination pairs (e.g. source destination IP addresses in our embodiment).

A third advantage of embodiments of systems and methods in accordance with the invention is that the invention is able to utilize both numerical and categorical features from a time series of network data traffic in an efficient manner to train the alert module of the invention to detect and classify a wide variety of potential malicious network behaviours thereby negating the need to hand engineer differing window sizes or employ simplistic mean, median, standard deviations, etc. for feature engineering.

A fourth advantage of embodiments of systems and methods in accordance with the invention is that the invention is able to train both the embedding layer in the data pre-processing module and the autoencoder in an end-to-end fashion to provide good embeddings for the categorical features and as a result, good encodings for the time series of network traffic features.

A fifth advantage of embodiments of systems and methods in accordance with the invention is that numerical representations of the categorical features are also not hand engineered. Instead, they are learnt automatically by an embedding layer, located in the data pre-processing module, improving the efficiency of the neural networks.

A sixth advantage of embodiments of systems and methods in accordance with the invention is that numerical stability may be preserved when the autoencoder is trained, despite the embedding layer (to embed the categorical features) being trained in the data pre-processing module simultaneously, in an end-to-end manner.

A seventh advantage of embodiments of systems and methods in accordance with the invention is that the system may update itself in an online manner, based on new partially labelled data that is constantly being streamed to the system.

An eighth advantage of embodiments of systems and methods in accordance with the invention is that the system may make use of new partially labelled data that are being streamed in to adjust its dynamic threshold to detect and classify whether the various potential malicious network traffic of interest are present or not.

A ninth advantage of embodiments of systems and methods in accordance with the invention is that each unlabelled input network data traffic can be classified into multiple threat types.

The above advantages are provided by embodiments of a method in accordance with the invention operating in the following manner.

According to a first aspect of the invention, a system for detecting potential malicious network activities in data traffic is disclosed, the system comprising: a data pre-processing module configured to: extract time-series features from a set of traffic data; tokenize categorical features from the extracted time-series features and embed the tokenized features into corresponding dimensional embedding vectors; an alert module communicatively connected to an output of the data pre-processing module, the alert module comprising a trained autoencoder having a trained encoder with an output coupled to a trained classifier neural network, the alert module being configured to: detect and classify possible malicious network behaviour in the extracted time-series features and in the dimensional embedding vectors as obtained from the data pre-processing module, whereby the trained encoder comprises locked-in encodings associated with the trained autoencoder, and whereby the autoencoder is trained, using a bootstrapping method, based on time-series features that were extracted and processed from an entire training set of data traffic, whereby the processed time-series features comprise numerical features and dimensional embedding vectors generated from tokenized categorical features using the data pre-processing module, and whereby the classifier neural network is initialized using time-series labelled data provided as input to the trained data pre-processing module, wherein the initialized classifier neural network is subsequently trained using static labels for labelled data and dynamically generated labels for unlabelled data.

With regard to the first aspect of the invention, the bootstrapping method comprises the steps of: for each iteration in the training of the autoencoder, reducing a L2 reconstruction loss between an output of the autoencoder and a fixed copy of input time-series comprising numerical features and learnable embeddings of categorical features.

With regard to the first aspect of the invention, the autoencoder comprises Multi-Layered Perceptrons (MLP), Convolutional Neural Networks (CNN), Recurrent Neural Networks (RNN) or any combination thereof.

With regard to the first aspect of the invention, the locked-in encodings associated with the trained encoder comprise fixed encodings generated as a result of the autoencoder being trained.

With regard to the first aspect of the invention, the tokenizing of the categorical features from the extracted time-series features comprises the data pre-processing module being configured to assign unique integer values to each unique categorical feature in the entire set of extracted time-series.

With regard to the first aspect of the invention, the tokenizing of the categorical features from the extracted time-series features comprises the data pre-processing module being configured to assign unique integer values to each occurrence of the categorical feature in each extracted time-series.

With regard to the first aspect of the invention, the conversion of tokens to dimensional embeddings comprises the data pre-processing module being configured to assign dimensional embeddings for each unique token in the time series.

With regard to the first aspect of the invention, the initialization of the classifier neural network comprises the alert module being configured to use a supervised learning technique to train the classifier neural network, based on the labelled time-series data provided to the input of the trained data pre-processing module.

With regard to the first aspect of the invention, the training of the initialized classifier neural network using static labels for labelled data and dynamically generated labels for unlabelled data comprises the alert module being configured to: compute confidence scores for each threat type in the labelled data; generate a threshold value for each threat type based on the computed confidence scores for each threat in the labelled data; dynamically label the unlabelled data using the generated threshold values for each of the threat types; and train the initialized classifier neural network using the labelled and dynamically labelled data.

With regard to the first aspect of the invention, the alert module is further configured to use a static or a dynamically computed threshold that is based on recent network traffic data and alerts to detect potential malicious network activities in data traffic.

With regard to the first aspect of the invention, the alert module is configured to be updated in an online manner using new network traffic data and associated alerts from other existing models.

According to a second aspect of the invention, a method for detecting potential malicious network activities in data traffic using a system comprising a data pre-processing module and an alert module communicatively connected to an output of the data pre-processing module, whereby the alert module comprises a trained autoencoder having a trained encoder with an output coupled to a trained classifier neural network is disclosed, the method comprising: extracting, using the data pre-processing module, time-series features from a set of traffic data; tokenizing, using the data pre-processing module, categorical features from the extracted time-series features and embedding the tokenized features into corresponding dimensional embedding vectors; detecting and classifying, using the alert module, possible malicious network behaviour in the extracted time-series features and in the dimensional embedding vectors as obtained from the data pre-processing module, whereby the trained encoder comprises locked-in encodings associated with the trained autoencoder, and whereby the autoencoder is trained, using a bootstrapping method, based on time-series features that were extracted and processed from an entire training set of data traffic, whereby the processed time-series features comprise numerical features and dimensional embedding vectors generated from tokenized categorical features using the data pre-processing module, and whereby the classifier neural network is initialized using time-series labelled data provided as input to the trained data pre-processing module, wherein the initialized classifier neural network is subsequently trained using static labels for labelled data and dynamically generated labels for unlabelled data.

With regard to the second aspect of the invention, the bootstrapping method comprises the steps of: for each iteration in the training of the autoencoder, reducing a L2 reconstruction loss between an output of the autoencoder and a fixed copy of input time-series comprising numerical features and learnable embeddings of categorical features.

With regard to the second aspect of the invention, the autoencoder comprises Multi-Layered Perceptrons (MLP), Convolutional Neural Networks (CNN), Recurrent Neural Networks (RNN) or any combination thereof.

With regard to the second aspect of the invention, the locked-in encodings associated with the trained encoder comprise fixed encodings generated as a result of the autoencoder being trained.

With regard to the second aspect of the invention, the tokenizing of the categorical features from the extracted time-series features comprises: assigning, using the data pre-processing module, unique integer values to each unique categorical feature in the entire set of extracted time-series.

With regard to the second aspect of the invention, the tokenizing of the categorical features from the extracted time-series features comprises: assigning, using the data pre-processing module, unique integer values to each occurrence of the categorical feature in each extracted time-series.

With regard to the second aspect of the invention, the conversion of tokens to dimensional embeddings comprises: assigning, using the data pre-processing module, dimensional embeddings for each unique token in the time series.

With regard to the second aspect of the invention, the initialization of the classifier neural network comprises: training, using the alert module, the classifier neural network using a supervised learning technique, the training being based on the labelled time-series data provided to the input of the trained data pre-processing module.

With regard to the second aspect of the invention, the training of the initialized classifier neural network using static labels for labelled data and dynamically generated labels for unlabelled data comprises: computing, using the alert module, confidence scores for each threat type in the labelled data; generating, using the alert module, a threshold value for each threat type based on the computed confidence scores for each threat in the labelled data; dynamically labelling, using the alert module, the unlabelled data using the generated threshold values for each of the threat types; and training, using the alert module, the initialized classifier neural network using the labelled and dynamically labelled data.

With regard to the second aspect of the invention, the method further comprises the step of: detecting, using the alert module, potential malicious network activities in data traffic by using a static or a dynamically computed threshold that is based on recent network traffic data and alerts.

With regard to the second aspect of the invention, the method further comprises the step of: updating, using the alert module, the alert module in an online manner using new network traffic data and associated alerts from other existing models.

BRIEF DESCRIPTION OF THE DRAWINGS

The above and other problems are solved by features and advantages of a system and method in accordance with the present invention described in the detailed description and shown in the following drawings.

DETAILED DESCRIPTION

This invention relates to a system and method for detecting and classifying potential malicious network behaviour contained within data traffic. In particular, this invention relates to a system comprising a data pre-processing module for processing the received data traffic before the processed data traffic is provided to an alert module that is communicatively connected to an output of the data pre-processing module. The alert module in general comprises two parts. The first part comprises an autoencoder that is trained using a bootstrapping method, and the second part comprises a classifier neural network in combination with the data pre-processing module and encoder (of the trained autoencoder), which are both locked-in/frozen (i.e. fixed weights with no further training) producing fixed deterministic encodings, whereby this combination is initialized using only labelled data and subsequently trained using both labelled and unlabelled data via the self-taught learning training process. The trained alert module is then used with the data pre-processing module to determine, based on its trained data (both labelled and unlabelled), if potential malicious network behaviours are contained within the processed data traffic of interest and if so, the type of malicious behaviours exhibited.

The present invention will now be described in detail with reference to several embodiments thereof as illustrated in the accompanying drawings. In the following description, numerous specific features are set forth in order to provide a thorough understanding of the embodiments of the present invention. It will be apparent, however, to one skilled in the art, that embodiments may be realised without some or all of the specific features. Such embodiments should also fall within the scope of the current invention. Further, certain process steps and/or structures in the following may not have been described in detail and the reader will be referred to a corresponding citation so as to not obscure the present invention unnecessarily.

Further, one skilled in the art will recognize that many functional units in this description have been labelled as modules throughout the specification. The person skilled in the art will also recognize that a module may be implemented as circuits, logic chips or any sort of discrete component. Still further, one skilled in the art will also recognize that a module may be implemented in software which may then be executed by a variety of processors. In embodiments of the invention, a module may also comprise computer instructions or executable code that may instruct a computer processor to carry out a sequence of events based on instructions received. The choice of the implementation of the modules is left as a design choice to a person skilled in the art and does not limit the scope of this invention in any way.

Figure 1:
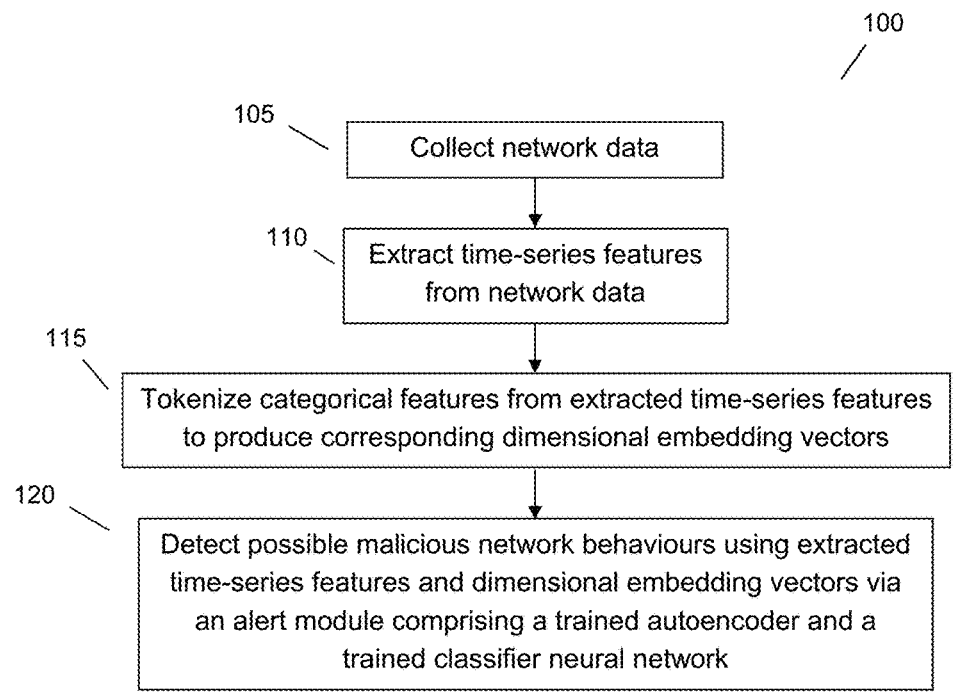
FIG. 1 illustrating a process or method for detecting and classifying potential malicious network behaviours in data traffic of a computer network in accordance with embodiments of the invention.

FIG. 1 sets out an exemplary flowchart of process 100 for detecting and classifying various possible malicious network behaviours in data traffic in accordance with embodiments of the invention. Process 100 which is performed by a pre-processing module and an alert module comprises the following steps:

Step 105: collecting network data;

Step 110: extracting time-series features from the network data collected at Step 105;

Step 115: tokenizing categorical features from the extracted time-series features to produce corresponding dimensional embedding vectors; and Step 120: detecting and classifying possible malicious network behaviours, using the extracted time-series features and dimensional vectors, via the alert module which comprises a trained autoencoder and a trained classifier neural network.

Figure 2:
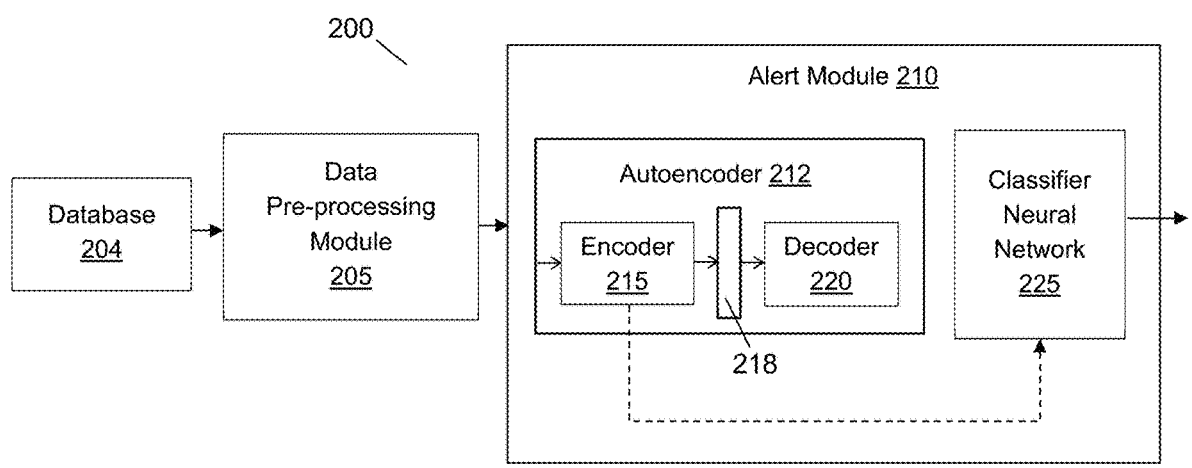
FIG. 2 illustrating a block diagram of modules that may be used to implement the method for detecting and classifying potential malicious network behaviours in data traffic in accordance with embodiments of the invention.

The steps of process 100 may be performed by modules contained within system 200, as illustrated in FIG. 2, whereby system 200 comprises data pre-processing module 205 and alert module 210 which in turn comprises autoencoder 212 and classifier neural network 225. As shown in FIG. 2, the outputs from module 205 will be provided to alert module 210 to be further processed by the modules within module 210. In embodiments of the invention, the respective modules of system 200 may be implemented in a computer system.

Additionally, as illustrated, it can be seen that generally, autoencoder 212 comprises two parts, an encoder 215 and a decoder 220. One skilled in the art will recognize that encoder 215 is configured to map high dimensional input features from an input layer to a lower dimensional encoding that can then be used to represent the input while decoder 220 is configured to map the lower dimensional encoding to a reconstruction of the high dimensional input features from the input layer. The encoder 215 may be considered as part of a deep neural network in the sense that information from the input is passed through several mappings (and hidden layers), similar to the deep architecture in typical supervised deep learning models; and likewise for the decoder 220. The learning of the native parameters of the encoder and decoder are generally achieved by minimizing the reconstruction errors (e.g. mean square errors) via backpropagation with random initialization, and can be optimized with a variety of optimizers known to those skilled in the art. In short, it can be said that the autoencoder may be viewed as a deterministic model that maps a set of inputs into their low dimensional encodings and their corresponding reconstructed outputs. Once trained, the autoencoder may be used in the process to produce fixed deterministic encodings to facilitate the subsequent dynamic labelling of unlabelled input data, as part of the self-taught learning process.

Classifier neural network 225 may comprise, but is not limited to, machine learning algorithms that are configured to learn functions that map an input to an output based on example input-output pairs, i.e. labelled data. As known to one skilled in the art, such networks typically derive such functions by inferring the function from labelled training data.

Figure 3:
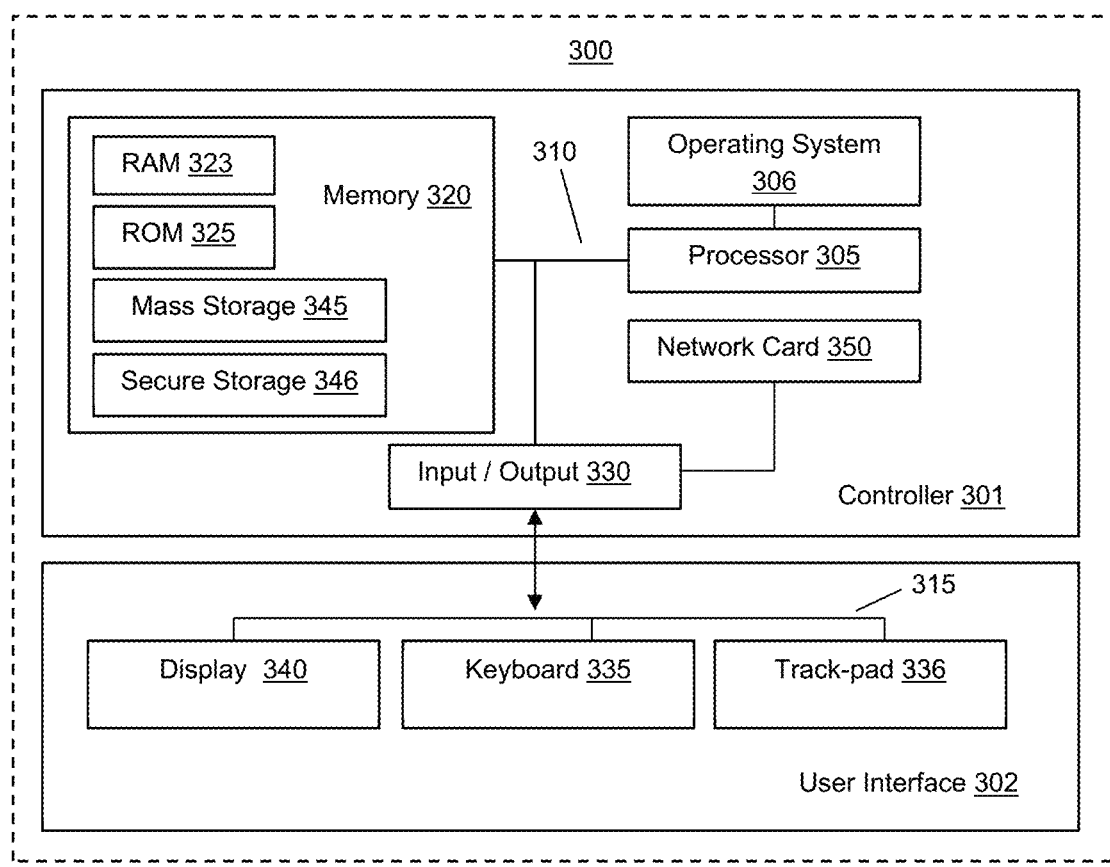
FIG. 3 illustrating a block diagram representative of processing systems providing embodiments in accordance with embodiments of the invention FIG. 4A illustrating four (4) exemplary time series features as extracted from a set of data traffic in accordance with embodiments of the invention.

In accordance with embodiments of the invention, a block diagram representative of components of processing system 300 that may be provided within modules 205, 210, 212, 215, 220 and 225 for implementing embodiments in accordance with embodiments of the invention is illustrated in FIG. 3. One skilled in the art will recognize that the exact configuration of each processing system provided within these modules may be different and the exact configuration of processing system 300 may vary and FIG. 3 is provided by way of example only.

In embodiments of the invention, each of modules 205, 210, 215, 220 and 225 may comprise controller 301 and user interface 302. User interface 302 is arranged to enable manual interactions between a user and each of these modules as required and for this purpose includes the input/output components required for the user to enter instructions to provide updates to each of these modules. A person skilled in the art will recognize that components of user interface 302 may vary from embodiment to embodiment but will typically include one or more of display 340, keyboard 335 and track-pad 336.

Controller 301 is in data communication with user interface 302 via bus 315 and includes memory 320, processor 305 mounted on a circuit board that processes instructions and data for performing the method of this embodiment, an operating system 306, an input/output (I/O) interface 330 for communicating with user interface 302 and a communications interface, in this embodiment in the form of a network card 350. Network card 350 may, for example, be utilized to send data from these modules via a wired or wireless network to other processing devices or to receive data via the wired or wireless network. Wireless networks that may be utilized by network card 350 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 320 and operating system 306 are in data communication with CPU 305 via bus 310. The memory components include both volatile and non-volatile memory and more than one of each type of memory, including Random Access Memory (RAM) 320, Read Only Memory (ROM) 325 and a mass storage device 345, the last comprising one or more solid-state drives (SSDs). Memory 320 also includes secure storage 346 for securely storing secret keys, or private keys. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 320 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device or other computational device. That is, processor 305 may be provided by any suitable logic circuitry for receiving inputs, processing them in accordance with instructions stored in memory and generating outputs (for example to the memory components or on display 340). In this embodiment, processor 305 may be a single core or multi-core processor with memory addressable space. In one example, processor 305 may be multi-core, comprising—for example—an 8 core CPU. In another example, it could be a cluster of CPU cores operating in parallel to accelerate computations.

With reference to FIG. 1, at step 105, network data in the form of data traffic are constantly collected within a monitored network and stored in database 204. In embodiments of the invention, one skilled in the art will recognize that database 204 may be integrated with data pre-processing module 205 into a single module without departing from the invention. In the following description, for illustration purposes, it shall be assumed that the network data collected comprises NetFlow records. It should be appreciated that other forms of aggregate data that are collectable by routers, packet brokers, etc. may be collected at step 105 and stored in database 204. It should also be appreciated that the type of data collected at step 105 and stored in database 204 is not specifically limited only to NetFlow type records and may be applied to other types of traffic data too, including but not limited to DNS, Netflow, PCAP, etc. In the subsequent description, although reference is made only to NetFlow records, one skilled in the art will recognize that the described method and system may also be applied to other types of traffic data without departing from the invention.

For completeness, it should be mentioned that a NetFlow record comprises, but is not limited to, a set of packets that has the same five-tuple of source and destination IP addresses, source and destination ports, and protocol. In addition to the above, some of the important fields collected in the NetFlow records include, but are not limited to, the start time of the flow (based on the first sampled packet), duration, protocols, ports, number of packets, octet and reverse octet packet sizes, and Transmission Control Protocol (TCP) flag.

Figure 4A:
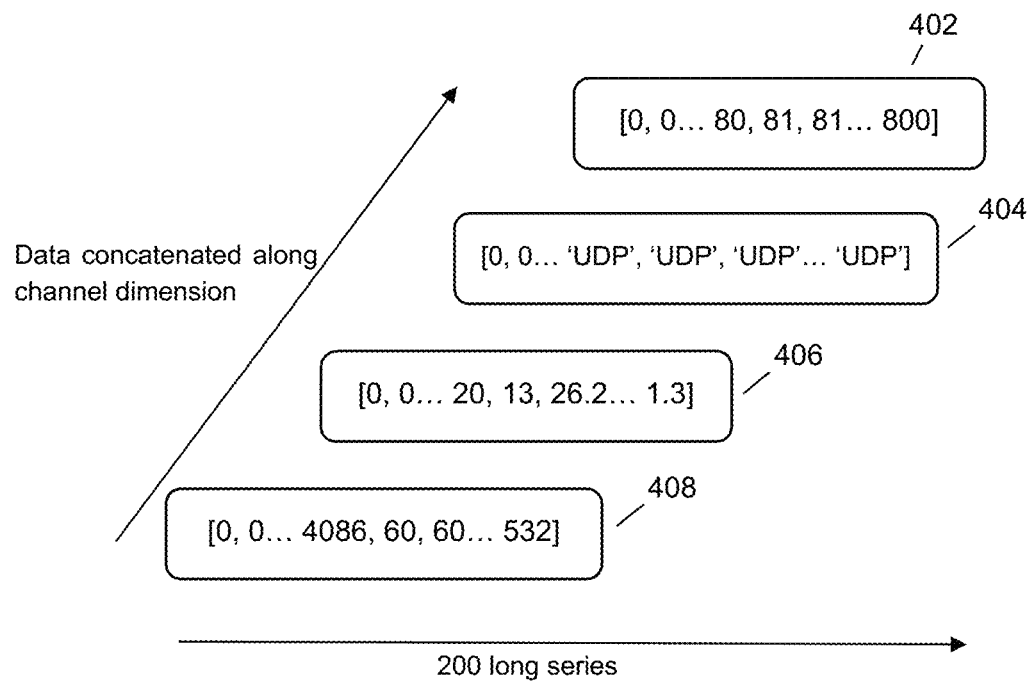
FIG. 4B illustrating the four (4) exemplary time series features after the categorical features have been tokenized to integer values in accordance with embodiments of the invention.
FIG. 4C illustrating the four (4) exemplary time series features after the tokenized categorical features have been embedded into their corresponding dimensional embedding vectors in accordance with embodiments of the invention.
Figure 4B:
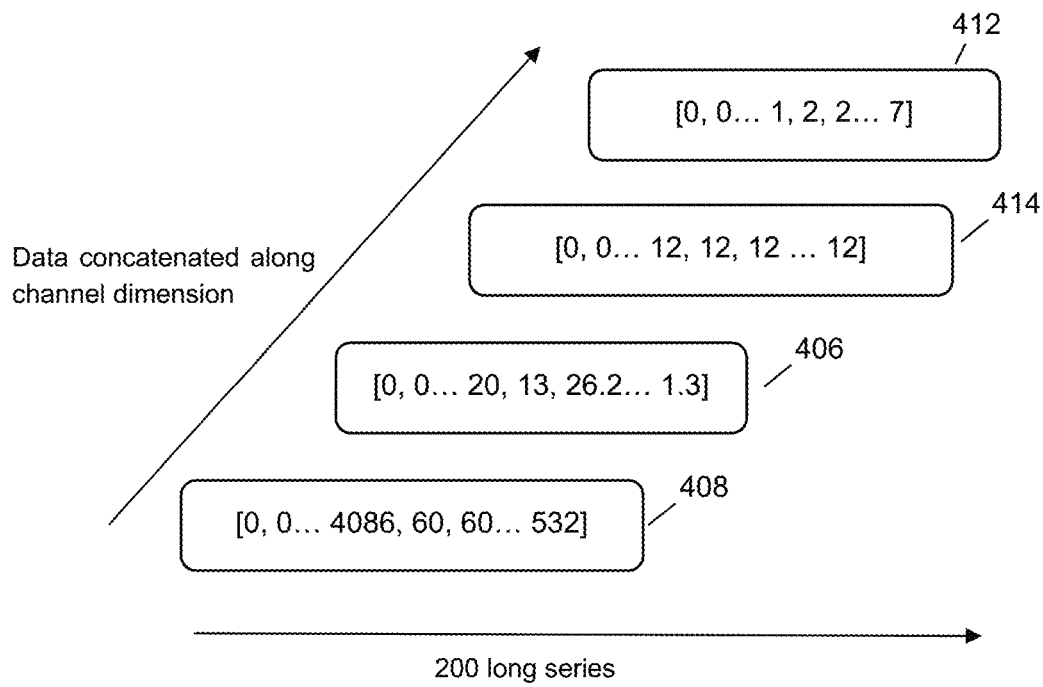
Figure 4C:
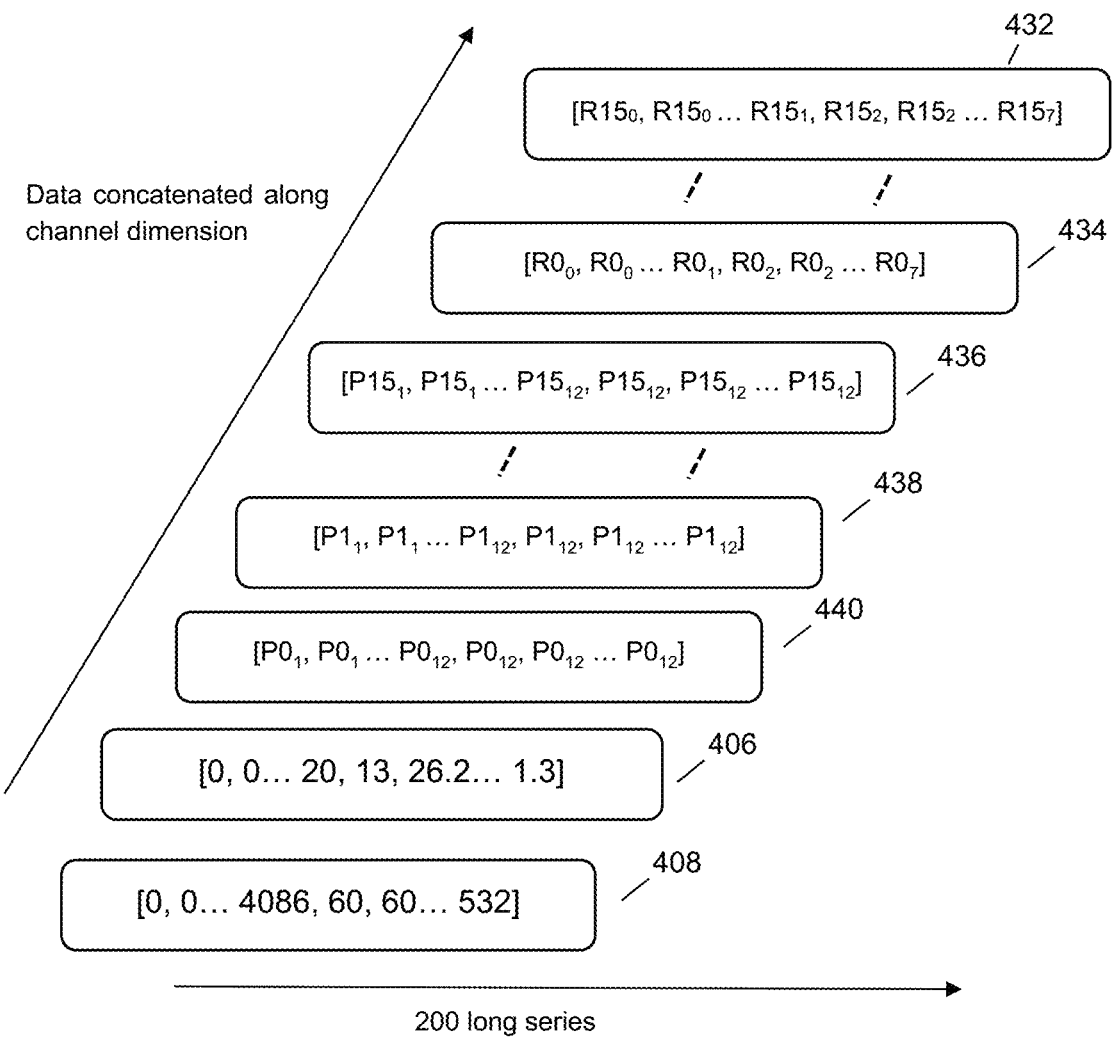

At step 110, using module 205, the NetFlow records are grouped by source and destination Internet Protocol (IP) addresses. A plurality of time-series features are then extracted from the grouped data, such as a list of octets (including reverse octets), interval times, protocols and ports. One skilled in the art will recognize that any number of time-series features comprising both numerical and/or categorical features may be extracted from the group data without departing from the invention and that these four time-series features as illustrated in FIGS. 4A-4C were only selected to illustrate the workings of the invention. Additionally, it is worthwhile to note that the reverse octet time-series feature was excluded in subsequent illustrations for brevity and to avoid confusion.

Among the extracted time-series features are numerical features such as the octet time series which comprise traffic records which set out the number of bytes flowing between source and destination IP addresses and the interval time series which contain the time intervals between individual traffic records, in this case the time intervals between individual NetFlow records. The extracted time-series features also include categorical features such as the protocol series which sets out the transmission protocol of each record and the ports series which sets out all ports used by the destination IP. It should be noted that although the port series comprises numerical values, these numerical values of the port series consist of large numerals without any notion of scale, e.g. 800, 1020, etc., and as such, should be treated as categorical features as well. The time series of these four features are illustrated in FIG. 4A as port series 402, protocol series 404, interval time series 406 and octet time series 408 whereby each of the time series are pre-padded with 0's to an arbitrary length, e.g. a 200 long series. One skilled in the art will recognize that the plurality of time series may be padded, both pre-padded and post-padded, to any lengths without departing from the invention.

At step 115 of process 100 in FIG. 1, the categorical features in the extracted time-series features, i.e. port series 402 and protocol series 404, are then tokenized using module 205 to produce tokenized port series 412 and protocol series 414 as illustrated in FIG. 4B. During the tokenization process, integer values are assigned to each categorical feature. This means that a number is assigned to each protocol in protocol series 404 producing tokenized protocol series 414. As for port series 402, the occurrence of different ports are tokenized with different integer values. For example, when the sequence of the port series 402 is [80,80,81,90,80], the tokenisation process will tokenize it to [1,1,2,3,1]. As can be seen, there are only a maximum of 3 tokens used in this tokenisation schema as there are only 3 unique ports in the example list of ports. Token "0" was not used as this integer was reserved for padding. This process is then carried out for every time series of ports independently as there are a great number of ports available and it would not be efficient to tokenize every single one of them. This means that we are not using ports in and by itself as a feature, but rather the sequence of ports as a feature. This also means that in this embodiment, the maximum number of port tokens is set to be 200 as there are 200 time steps. As a result, we will get 200 port tokens only if every time step utilises a different port. Upon completion of the tokenization process, each of the categorical time series 412 and 414 would then be of the same length as the numerical time series 406 and 408. In short, each of time series 412 and 414 would comprise 200 tokens each as each time series was set to be 200 long.

Once this is done, module 205 then proceeds to embed the tokenized categorical features into vectors whereby each token is embedded into a 16 (arbitrarily chosen) dimensional vector. As illustrated in FIG. 4C, each of time series 412 and 414 have been embedded into 16 channels (channel 0 to channel 15) each whereby time series 412 has been embedded into vectors 432-434 (R0 to R15) and time series 414 has been embedded into vectors 436-440 (P0 to P15) where each of the channels represent the time series for that dimension. For example, the notation $P15_{12}$ in time series 436 refers to dimension 15 of the embedding for Protocol token 12 (from time series 414) and the notation $P1_{12}$ in vector 438 refers to dimension 1 of the embedding for Protocol token 12 (from time series 414), which from the time series 404 implies that they represent dimension 15 and dimension 1 for the embedding of 'UDP' respectively.

At step 120 of process 100 in FIG. 1, possible malicious behaviours are then detected and classified using a trained autoencoder 212 and a trained classifier neural network 225 as contained within alert module 210, with the extracted time-series features, i.e. the numerical features, and dimensional embedding vectors corresponding to the categorical features produced by data pre-processing module 205 as inputs to the encoder 215.

As illustrated in FIG. 2, autoencoder 212 comprises of encoder 215 and decoder 220. Although not shown, it should be understood that data pre-processing module 205 comprises an embedding layer configured to embed input data in the form of categorical time-series data into a time-series of embedding vectors. Within encoder 215, the time-series embedding vectors of categorical features and the time-series of numerical features are then encoded into a vector using either a Recurrent Neural Network (RNN) or Convolutional Neural Network (CNN) to produce a set of encodings 218. Decoder 220, which may be CNN or RNN based, is then configured to decode the encodings 218 from encoder 215 and to produce as its output an attempted reconstruction of the processed time series (i.e. output from the data pre-processing module 205). During the training of the autoencoder 212 and the embedding layer in the data pre-processing module 205, both the processed time series, produced by data pre-processing module 205, and encodings 218, produced by encoder 215, will be continuously adjusted, with the objective of minimising the L2 reconstruction loss between the processed time series (i.e. output of the data pre-processing model, which consists of both numerical features and embeddings of categorical features, or equivalently the input to encoder 215) and the reconstructed time series at the output of decoder 220. Once trained, autoencoder 212 would have learnt a set of informative encodings 218 and the data pre-processing module would have learnt a set of informative embeddings on how to embed each categorical feature.

The naïve method of training the autoencoder would be to reduce the L2 reconstruction loss between the input to encoder 215, which comprises of both time-series of numerical values and time-series of dimensional embeddings that correspond to the time-series of categorical features, and the reconstructed time series at the output of decoder 220. This is possible if the embeddings are hand engineered and fixed, as in the case of one hot embeddings. However, when the embeddings comprise trainable parameters and are not fixed, such a method would fail. For example, if the embedding layer is being trained to simply minimize the L2 reconstruction loss between the time-series embeddings in encoder 215 and the reconstructed time series embeddings at the output of decoder 220, the embedding layer would simply learn to embed every categorical variable as zero '0'. This results in significant instability in the training of such a network, which is why most, if not all, literature provide fixed embeddings to the CNN/RN N to encode. Additionally, if this were done, it would be extremely simple for a neural network with Rectified Linear Unit (ReLu) activations to learn the embeddings and reconstruct it from the encodings. As a result, it has previously been proposed that a one hot encoding approach be utilized to encode the time series of categorical features prior to feeding them to the encoder, instead of a trainable embedding layer, because the one hot encoding method comprises a fixed embedding method that does not need to be learnt. The disadvantage of the one hot encoding method is the non-scalability of the solution as the embedding dimension scales linearly with the number of tokens. When the number of time steps increases, the number of tokens that may need to be embedded may increase. This causes the one hot encoding schema to result in increasingly sparser embeddings, which in turn results in significant computational overheads being wasted. An obvious way to address this issue would be to freeze the embedding layer (i.e. do not update the layer) however, this would mean that the embedding layer would not be trained.

Figure 5:
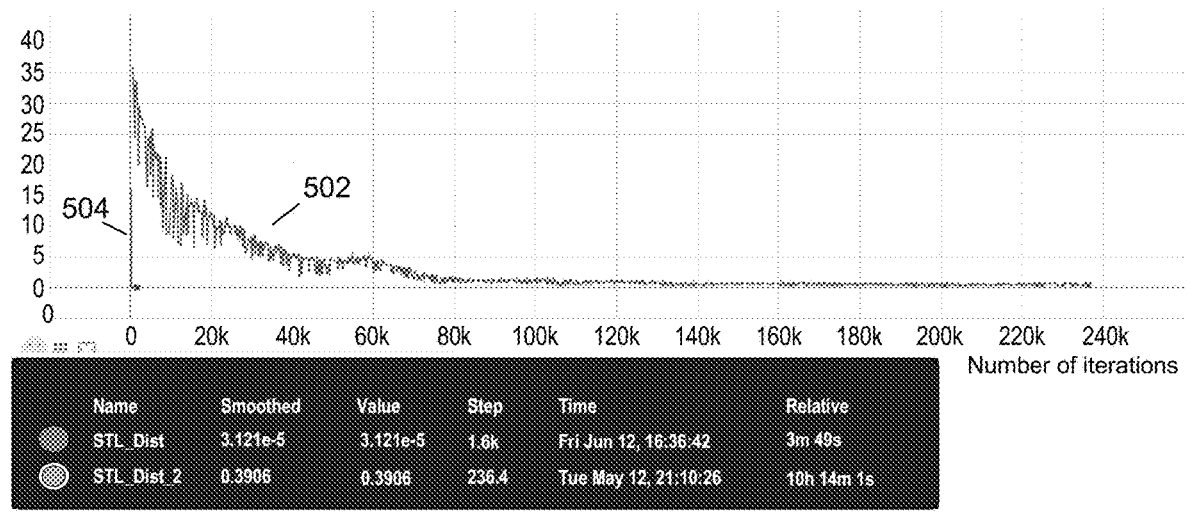
FIG. 5 illustrating a plot of autoencoder loss against the number of training steps for a conventional method, and for a method in accordance with embodiments of the invention for training both the autoencoder and embedding layer simultaneously.

The plot in FIG. 5 illustrates the autoencoder loss plotted against the number of iterations taken by the autoencoder to achieve a required L2 reconstruction loss value. In particular, plot 504 comprises the plot of the autoencoder loss when a conventional method known in the art is used to train the autoencoder (i.e. by minimising the L2 reconstruction loss between the reconstructed time-series embeddings and the time-series embeddings at the encoder). As can be seen from plot 504, the autoencoder loss reduces to a low value rapidly and subsequently errors out because of NaN errors. This occurred as the embedding layer in the encoder learnt a very naïve embedding of simply embedding all the categorical features to '0', to achieve the required L2 reconstruction loss function. The resulting L2 reconstruction loss is extremely small and as such would then result in gradient instabilities and thus NaN errors occurring.

This means that instead of training both the embedding layer in data pre-processing module 205 and autoencoder 212 to reduce the L2 reconstruction loss between the time-series inputs to encoder 215 and the reconstructed time series at the output of decoder 220, in accordance with embodiments of the invention, the autoencoder is trained to reduce the L2 reconstruction loss between the reconstructed time series at the output of decoder 220 and a fixed instantaneous copy of the time-series inputs to encoder 215 at each training step. This process is known as bootstrapping and the effect is that learning is stabilized in both the embedding layer in data pre-processing module 205 and autoencoder 212. Further, this implies that gradients are allowed to propagate all the way back to even the embedding layer so that meaningful embeddings may be learnt.

This method of bootstrapping the loss takes inspiration from value based reinforcement learning methods. In reinforcement learning, an agent is configured to interact with an environment to find an optimal policy to achieve the most rewards from the environment. To achieve this goal, most state of the art algorithms give an estimate of how valuable its current state is (i.e. what are the rewards that it can expect given its current state and the states it could become given its current state). This is typically done by updating the value network's estimate of the current state's value function to be $V(S_t) \rightarrow V(S_t) + a(G_{t+1} - V(S_t))$, where a is the discount factor, $V( )$ is the value network's estimate given a particular state and $G_{t+1}$ is the ground truth value at time t+1. However as $G_{t+1}$ is unknown at time step t, an estimate of $G_{t+1}$ is made by using $V(S_{t+1})$ in its place. Thus, the value network is updated as follows: $V(S_t) \rightarrow V(S_t) + a(V(S_{t+1}) - V(S_t))$. The use of an estimate in place of the ground truth value is commonly known as bootstrapping.

Similarly, reducing the L2 loss between the decoded time series at the output of decoder 220 and a fixed copy of the time-series input to encoder 215, which serves as an estimate of the ideal input time-series consisting of both numerical features and embeddings for categorical features, while still allowing the weights in both the autoencoder 215 and embedding layer in data pre-processing module 205 to change at each training step is in fact a bootstrapping method.

In summary, as the ideal embedding function for the categorical time series is unknown, the current estimate is instead used as the target for the output of decoder 220. Essentially, the values of the processed time-series features input to the encoder, which comprises both time-series embeddings for categorical features and the time-series of numerical features, are copied and used as a target for the decoder to reconstruct (i.e. to minimise the L2 loss between the reconstructed time-series features at the decoder output and a fixed instantaneous copy of time-series features at the encoder input), while also allowing all trainable weights and embedding layers in both the autoencoder 212 and data pre-processing module 205 to change during the training process. The outcome of such a training is plotted as plot 502 in FIG. 5 where it can be seen that the learning of the autoencoder is stabilized over time and the autoencoder is able to learn meaningful clusters from the input data without utilizing memory intensive methods. Although plot 502 shows a large initial autoencoder loss, this slowly tapers off over time to produce a low, stabilized autoencoder loss.

Figure 6:
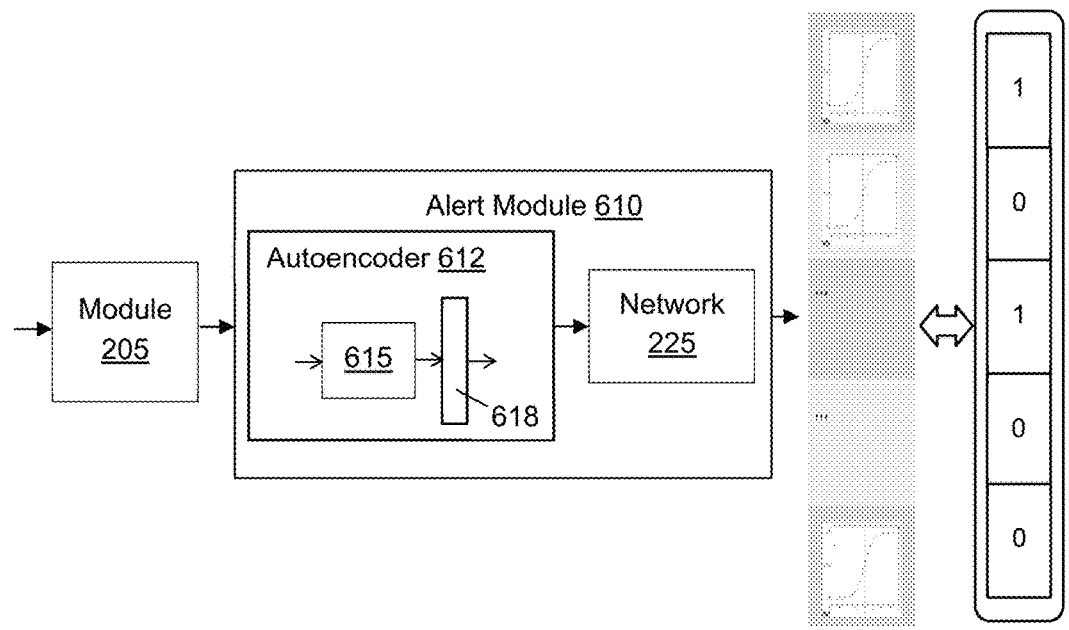
FIG. 6 illustrating the initialization of the alert module using only labelled data in accordance with embodiments of the invention.

Once autoencoder 212 is trained, this results in a data pre-processing module 205 and an encoder 215 and that is able to provide meaningful encodings when provided with input data. Such an autoencoder is illustrated in FIG. 6 whereby alert module 610 comprises autoencoder 612, having encoder 615 that has been trained using the bootstrapping method described above, and having encodings 618 output by encoder 615 that can be considered to be locked-in/frozen and deterministic based on the outcome of trained autoencoder 610. The output of encoder 615, illustrated by encodings 618, is then provided to classifier neural network 225 which comprises a MLP, whose final layer is sigmoid activated rather than softmax activated as shown in FIG. 6. As a result, the output of classifier network 225 comprises multiple sigmoid functions whereby each sigmoid function indicates whether a particular type of threat behaviour is present and additionally, it should be noted that a traffic data may be tagged by the alert module as being associated with more than one type of alert.

Labelled data comprising time-series data with labels are then provided to module 205 and subsequently to alert module 610 to train the classifier neural network 225 in a supervised manner. In particular, the conventional way of supervised learning is applied to classifier network 225 where the loss function comprises the binary cross entropy loss. During the training, the binary cross entropy loss between the output and the labels are then minimized and as the data is labelled, '1's and '0's are the labels that are used to compute the binary cross entropy loss. It should be noted that although FIG. 6 illustrates only 5 alert types at the output of alert module 610, i.e. [1, 0, 1, 0, and 0], the number of alert types may be expanded or contracted depending on the availability of labelled data for each alert type, without departing from the invention.

Figure 7:
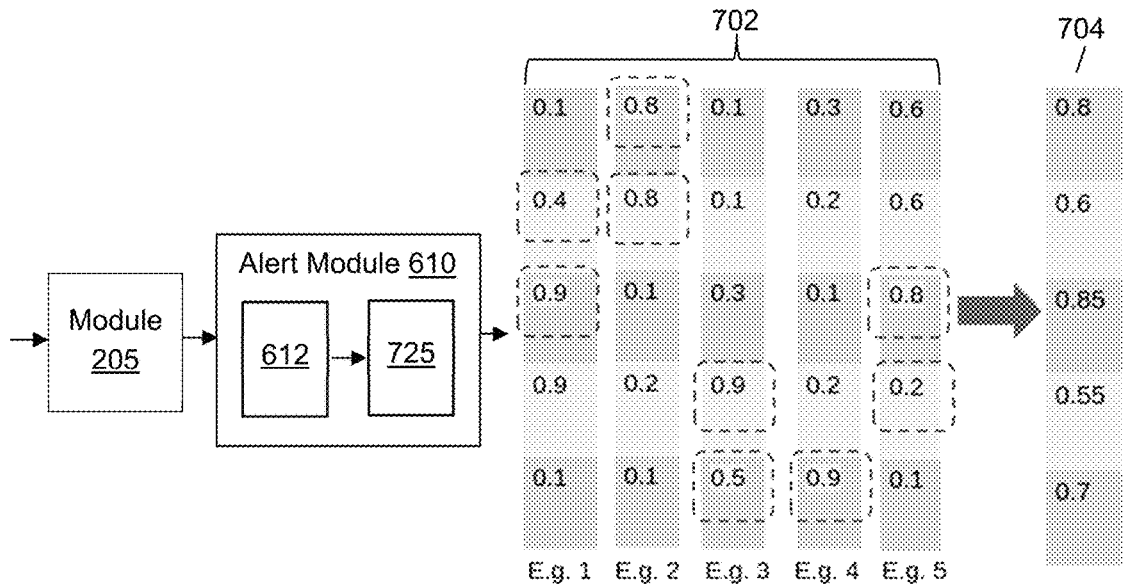
FIG. 7 illustrating the calculation of dynamic thresholds for each malicious activity of interest (i.e. alert type) via the alert module as shown in FIG. 6, using labelled data, after the alert module has been initialized or at the start of each training epoch of the self-taught learning training process in accordance with embodiments of the invention.

For clarity, the trained classifier neural network 225 (from FIG. 6) is then labelled as initialized neural network 725 in FIG. 7. The subsequent steps that follow are referred to collectively as the self-taught learning procedure and this procedure makes use of both labelled and unlabelled data. FIG. 7 illustrates the trained and locked-in/frozen data pre-processing module 205, the alert module 610 which comprises the trained and locked-in/frozen encoder 612 with its output connected to initialized classifier network 725. The first step of the self-taught learning procedure is to use the Classifier network 725 to run inference on the set of labelled data to obtain dynamic thresholds for each alert type. This is done by providing labelled data to module 205. Once the labelled input data has been processed by modules 205 and 612, whose weights are locked-in/frozen throughout the entire self-taught learning process, the static, deterministic encodings produced by 612 will be passed to 725. Due to the nature of the sigmoid function, the output of 725 or equivalently the output of module 610 will be output predictions ranging between 0 and 1 for each alert type.

As labelled data was used as the input data, one would be able to determine output predictions that should be associated with '0's and '1's provided by the labels, even though the generated output predictions comprise values between 0 and 1. This is illustrated in FIG. 7 with the assumption that five (5) labelled data are provided to module 205, just for illustrative purposes. After being processed by module 205 and subsequently by the various components within module 610, five (5) sets of output predictions 702 are produced with values ranging between 0 and 1. It should be noted that although the same set of labelled data may have been used in some embodiments to initialise classifier network 725 as part of the initialization process described earlier, the resulting output predictions may not correspond exactly due to residual errors, typical of all machine learning algorithms. As the input data comprised labelled data, module 610 is able to determine which output predictions are supposed to be labelled as '1's and '0's and as such, map it out accordingly (as shown in FIG. 7) with the '1's being 'circled with dotted lines' while those labelled as '0's being left as is. In short, there exists a discrepancy between the labelled data and module 610's confidence outputs. This is as expected as the models used in modules 205 and 610 can rarely be 100% accurate, as typical of all machine learning algorithms.

Based on output predictions 702, the dynamic thresholds for each class of threat or also referred to as possible malicious network behaviours may then be computed. If the $50^{th}$ percentile (with linear interpolation) of the output predictions are taken for each class of threat, the dynamic thresholds would then be computed as dynamic thresholds 704. It is important to note that upon completion of the computation process, each class of threat will have its own dynamic threshold. This process of computing the dynamic threshold for each class, using just labelled data, is done at the start of every epoch of the self-taught learning process, as it is a time and resource consuming process, whereby alert module 610 and module 205 has to thoroughly go through the entire labelled dataset in most embodiments to get good dynamic thresholds. In embodiments of the invention, the dynamic thresholds for each class are taken as the $90^{th}$ percentile of the output predictions for each class of threat. In embodiments of the invention, a subset of the labelled dataset may be used to compute the dynamic thresholds to accelerate the training process. In embodiments of the invention, the computation of the dynamic thresholds may also be computed after a predetermined number of steps instead of at the start of every self-taught learning training epoch.

Figure 8:
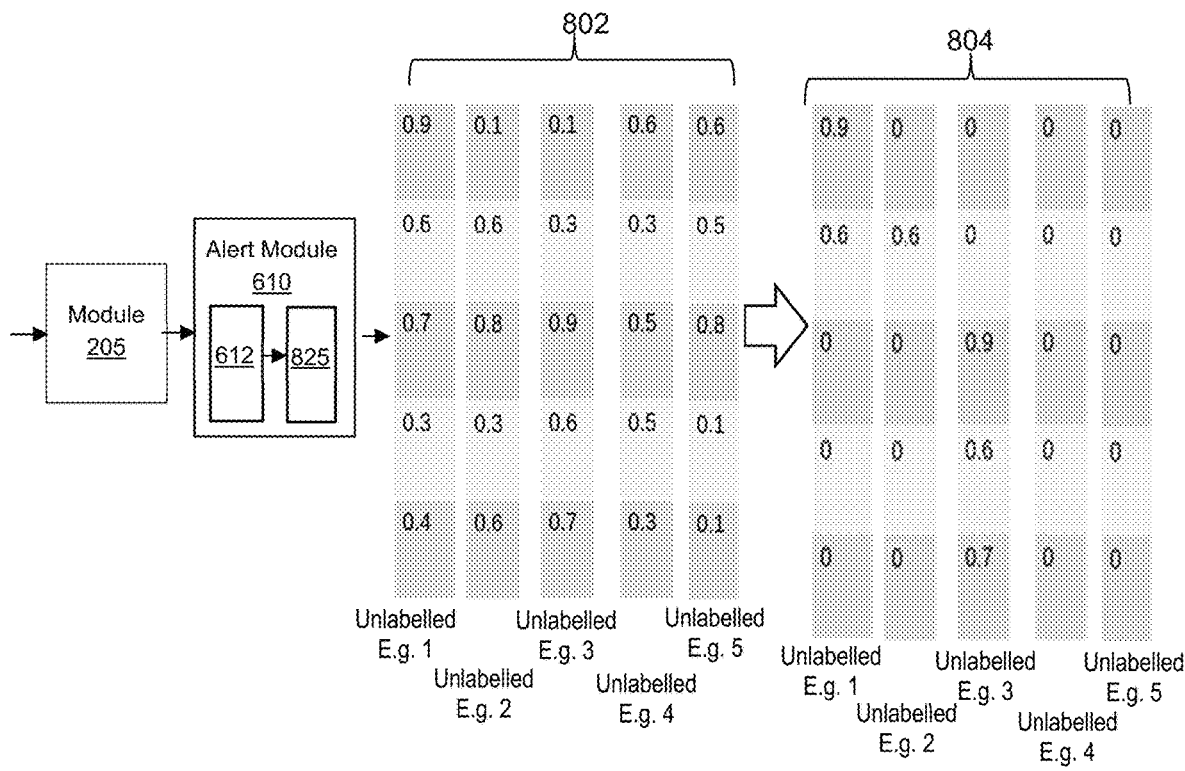
FIG. 8 illustrating how dynamic labels are generated for unlabelled data as part of the self-taught learning training process of the alert module as shown in in FIG. 7 in accordance with embodiments of the invention.

For clarity, the initialized neural network 725 that was previously used to compute the dynamic thresholds for each class of threat is then labelled as network 825 in FIG. 8. Hence, for every batch of unlabelled data received by network 825, network 825 will first compute output predictions based on these unlabelled data as inputs to module 205, whereby upon generating the output predictions, network 825 will then apply the previously computed dynamic thresholds to these predictions to obtain dynamically calculated labels for each of the class of threats.

As an example, it is assumed that unlabelled data is provided to both module 205 and consequently 610 in FIG. 8. After being processed by module 205 and autoencoder 612, network 825 will then compute output predictions 802 based on these unlabelled data. The dynamic threshold 704 is then applied to each class of threat thereby generating labels 804 for each class of threat. For example, with reference to the first row of output predictions 802, as the dynamic threshold for this class of threat was previously determined to be '0.8', only output prediction values that are larger than '0.8' will be retained. Further, the labels are not rounded to the integer '1'. Instead, its predicted value is merely preserved without rounding.

In embodiments of the invention, once the dynamically generated labels have been obtained for the unlabelled dataset, classifier network 825 may then be further trained by minimising the binary cross entropy loss between the model predictions and the entire dataset comprising of static labels (for labelled data) and dynamically generated labels (for unlabelled data). In other words, when additional labelled datasets are provided for training purposes, the binary cross entropy loss between the model predictions and the labels will be minimized by training just classifier network 825. Similarly, when unlabelled datasets are provided for training, the binary cross entropy loss between the model predictions and the dynamic labels (that were obtained via the steps above) are minimized by training just classifier network 825. It should be noted that modules 205 and 612 are locked-in/frozen as part of the entire self-taught learning procedure, and only the weights of the classifier network are trained. The classifier network can then be trained to convergence using this self-taught learning procedure of calculating dynamic labels for unlabelled data and then using them, together with labelled data, for further training.

Once this is done, the system comprising data pre-processing module 205 and trained alert module 610 may then be used to detect and classify potential malicious network behaviour in data traffic.

Figure 9A:
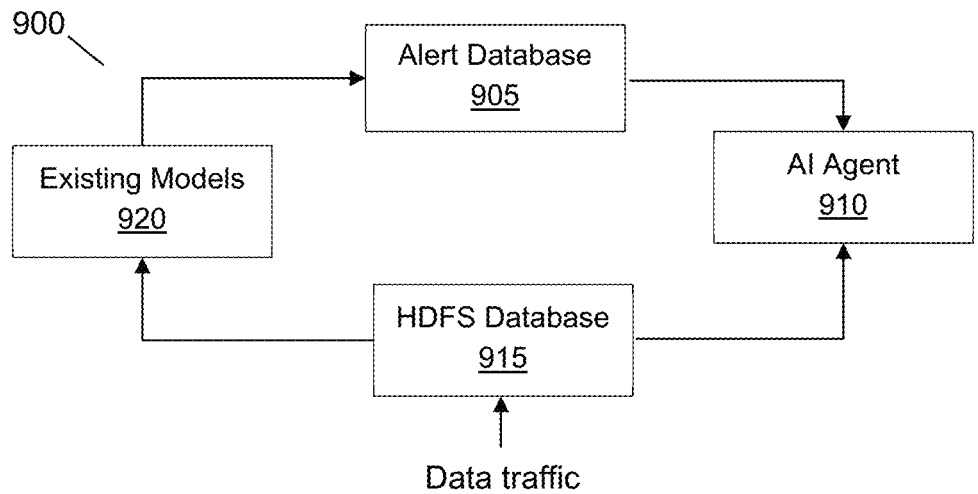
FIG. 9A illustrating an exemplary block diagram for the training of a system, using both labelled and unlabelled data, for detecting and classifying potential malicious network behaviour in data traffic of a computer network in accordance with embodiments of the invention.

An exemplary block diagram showing an implementation of the system in accordance with embodiments of the invention is illustrated in FIG. 9A. In particular, during the training phase, the system comprises an AI agent 910, a Hadoop file system database (HDFS) 915, an alert database 905, and a variety of existing threat detection models 920. One skilled in the art will recognize that the arrangement of the components are in no way limiting and is used to illustrate an exemplary implementation of the invention. In operation, it is assumed that AI agent 910 comprises data pre-processing module 205, with a randomly initialised embedding layer, and untrained alert module 210 as previously discussed. Received network traffic data is then provided to HDFS database 915. Existing models then access HDFS database 915 to predict whether each of the traffic data stored within HDFS database 915 comprise threats or not. Those that are identified as threats are then moved to alert database 905, which may be configured to run on a Hadoop file system. AI Agent 910 then takes raw data from both the HDFS database 915 and the alert database 905 to train itself as described above. Those data in HDFS database 915 without a corresponding alert in alert database 905 are treated as unlabelled data while those data with corresponding alerts in the alert database 905 are treated as labelled data.

Once AI agent 910 has been trained, i.e. AI agent 955 now comprises data pre-processing module 205 and trained alert module 610, trained AI agent 955 is now configured to produce alerts for alert database 905 based on received network traffic data. Threats stored in alert database 905 may then be forwarded to visualization system 925 to be further processed. In embodiments of the invention, AI agent 955 may be configured to have static thresholds for each alert type, which must be exceeded before an alert is declared. In embodiments of the invention, AI agent 955 may be configured to continuously receive inputs from the alert database 905 and the HDFS database 915 to compute updated dynamic thresholds, in an identical manner as how dynamic thresholds are calculated during the training process, which must be exceeded before an alert is declared. In embodiments of the invention, AI agent 955 may be configured to continuously receive inputs from the alert database 905 and the HDFS database 915 to further refine itself using the new data in an online fashion.

Figure 9B:
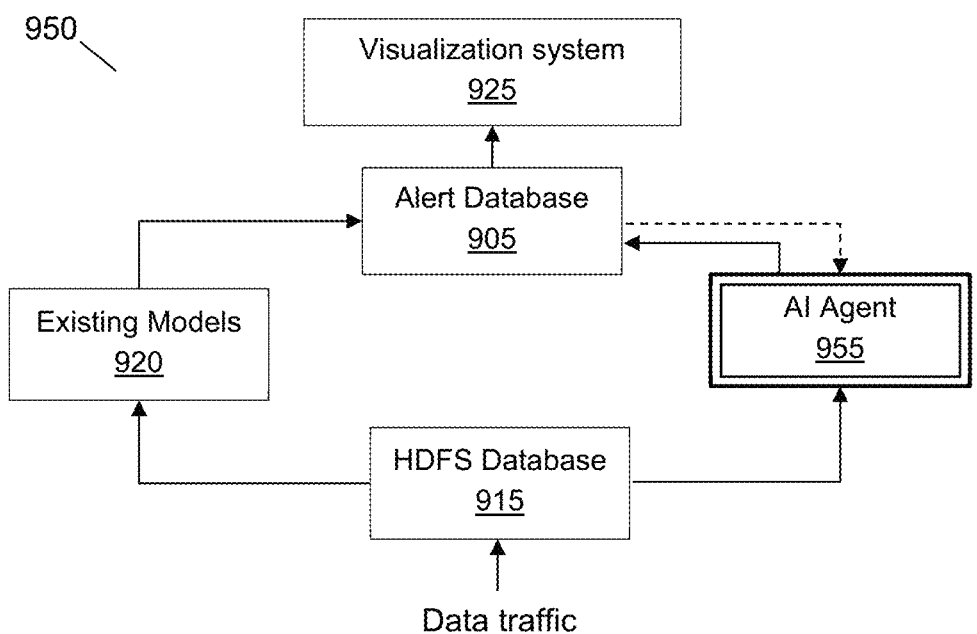
FIG. 9B illustrating an exemplary block diagram for the implementation of the system as trained in FIG. 9A for detecting and classifying potential malicious network behaviour in data traffic of a computer network in accordance with embodiments of the invention.
Figure 10:
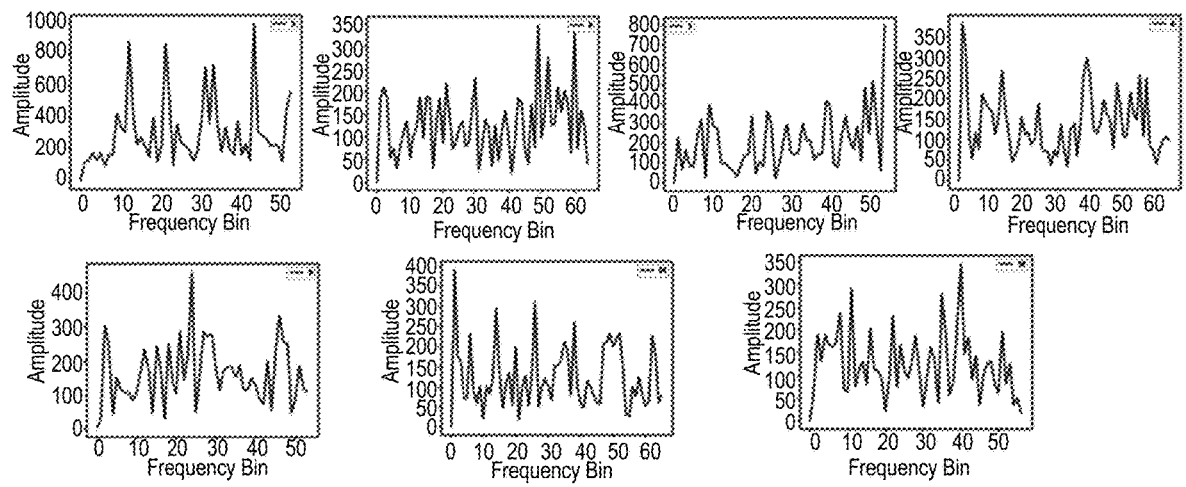
FIG. 10 illustrating exemplary frequency spectrums of interval time series of detected potential malicious network behaviour in data traffic that are classified as beaconing by embodiments of the invention whereby these malicious network behaviour were missed by other models.

When system 950 in FIG. 9B was implemented, it was found that it had a 2-fold impact. First, system 950 was found to pick up threats that other existing threat detection models may have missed. For example, in one hour's worth of data traffic, system 950 was able to detect 7 instances of beaconing activities that were not picked up by any other existing models. The frequency spectrums of the interval times of these 7 instances are illustrated in FIG. 10. The frequency spectrums show some strong peaks, suggestive of statistically significant frequency components in the interval times, which is a tell-tale sign of beaconing, where connections between specific source destination IP address pairs are made at regular intervals. Additionally, it is noted that each of these plots used only a single port, a single octet size, and has a frequency component that is 3 standard deviations away from the mean. Such characteristics display all known behaviours of beaconing and are clearly suspicious.

Figure 11:
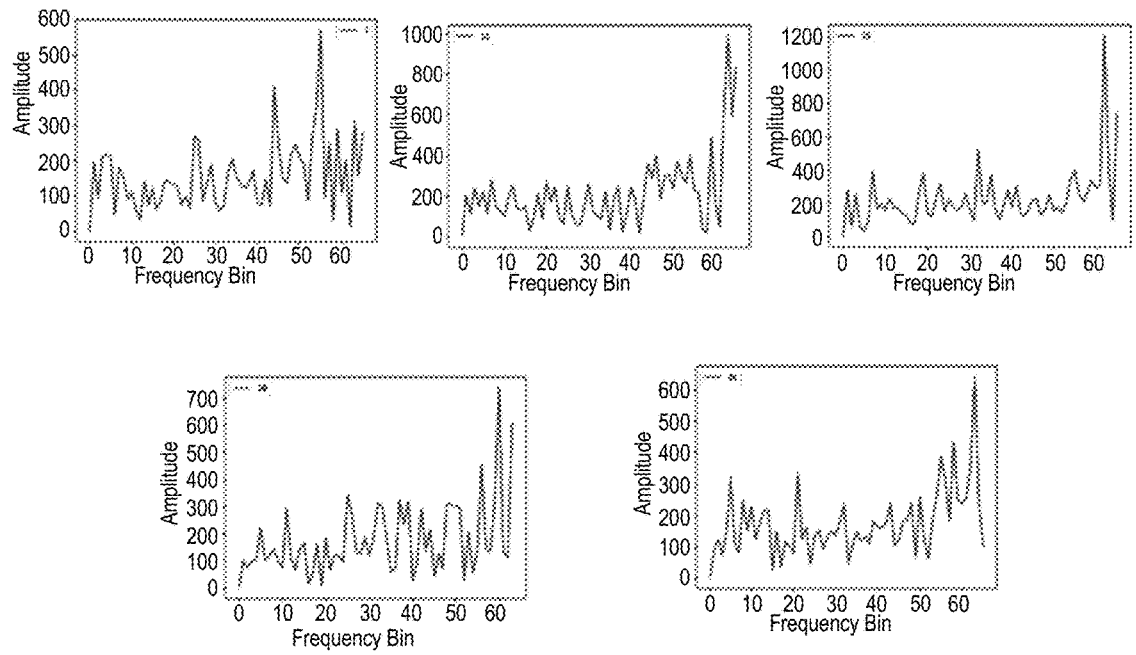
FIG. 11 illustrating exemplary frequency spectrums of interval time series of detected potential malicious network behaviour in data traffic having characteristics not previously known by threat analysts, these data traffic being classified as beaconing by embodiments of the invention whereby these potential malicious network behaviours were missed by other models.

Secondly, the invention facilitates the discovery of real unknowns in received data traffic. Typical beaconing activities will utilize a single octet size. However, when the above constraints were relaxed to a single port with 2 octet sizes, system 950 detected an additional 5 instances of interval times having a frequency component that is 4 standard deviations away from the mean, which is even more statistically significant. Although the use of 2 octet sizes is atypical of conventional beaconing activities, the statistically significant periodicity in the interval times is highly suspicious and may indicate a new type of beaconing activity or even multiple beaconing activities occurring between a source destination IP address pair. The frequency spectrums of these 5 interval time series are illustrated in FIG. 11. Based on the plots shown in FIG. 11, it can be seen that these data traffic may be classified as beaconing. However, our conventional models, thus far, would have missed these potential malicious network behaviours.

As such, it was found that the invention was able to detect and classify suspicious network behaviours that weren't picked up by other existing models. It was also able to discover possible new threat behaviours in labelled and unlabelled data traffic.

Numerous other changes, substitutions, variations and modifications may be ascertained by one skilled in the art and it is intended that the present invention encompass all such changes, substitutions, variations and modifications as falling within the scope of the appended claims.

The invention claimed is:

1. A system for detecting potential malicious network activities in data traffic, the system comprising:
  at least one memory;
  a data pre-processing module, implemented on the at least one memory, configured to:
    extract time-series features from a set of traffic data;
    tokenize categorical features from the extracted time-series features and embed the tokenized features into corresponding dimensional embedding vectors;
  an alert module, implemented on the at least one memory, communicatively connected to an output of the data pre-processing module, the alert module comprising a trained auto-encoder having a trained encoder with an output coupled to a trained classifier neural network, the alert module being configured to:
    detect and classify malicious network behaviour in the extracted time-series features and in the dimensional embedding vectors as obtained from the data pre-processing module,
    whereby the trained encoder comprises locked-in encodings associated with the trained auto-encoder, and whereby the auto-encoder is trained, using a bootstrapping method, based on time-series features that were extracted and processed from an entire training set of data traffic, whereby the processed time-series features comprise numerical features and dimensional embedding vectors generated from tokenized categorical features using the data pre-processing module, and
    whereby the classifier neural network is initialized using time-series labelled data provided as input to the trained data pre-processing module, wherein the initialized classifier neural network is subsequently trained using static labels for labelled data and dynamically generated labels for unlabelled data, wherein the bootstrapping method comprises the steps of:
      for each iteration in the training of the auto-encoder, reducing a L2 reconstruction loss between an output of the auto-encoder and a fixed copy of input time-series comprising numerical features and learnable embeddings of categorical features.

2. The system according to claim 1 wherein the auto-encoder comprises Multi-Layered Perceptrons (MLP), Convolutional Neural Networks (CNN), Recurrent Neural Networks (RNN) or any combination thereof.

3. The system according to claim 1 wherein the locked-in encodings associated with the trained encoder comprise fixed encodings generated as a result of the auto-encoder being trained.

4. The system according to claim 1 wherein the tokenizing of the categorical features from the extracted time-series features comprises the data pre-processing module being configured to assign unique integer values to each unique categorical feature in the entire set of extracted time-series.

5. The system according to claim 1 wherein the tokenizing of the categorical features from the extracted time-series features comprises the data pre-processing module being configured to assign unique integer values to each occurrence of the categorical feature in each extracted time-series.

6. The system according to claim 1 wherein the conversion of tokens to dimensional embeddings comprises the data pre-processing module being configured to assign dimensional embeddings for each unique token in the time series.

7. The system according to claim 1 wherein the initialization of the classifier neural network comprises the alert module being configured to use a supervised learning technique to train the classifier neural network, based on the labelled time-series data provided to the input of the trained data pre-processing module.

8. The system according to claim 1 wherein the training of the initialized classifier neural network using static labels for labelled data and dynamically generated labels for unlabelled data comprises the alert module being configured to:
  compute confidence scores for each threat type in the labelled data;
  generate a threshold value for each threat type based on the computed confidence scores for each threat in the labelled data;
  dynamically label the unlabelled data using the generated threshold values for each of the threat types; and
  train the initialized classifier neural network using the labelled and dynamically labelled data.

9. The system according to claim 1 wherein the alert module is configured to be updated in an online manner using new network traffic data and associated alerts from other existing models.

10. A method for detecting potential malicious network activities in data traffic using a system comprising a data pre-processing module and an alert module communicatively connected to an output of the data pre-processing module, whereby the alert module comprises a trained auto-encoder having a trained encoder with an output coupled to a trained classifier neural network, the method comprising:
 extracting, using the data pre-processing module, time-series features from a set of traffic data;
 tokenizing, using the data pre-processing module, categorical features from the extracted time-series features and embedding the tokenized features into corresponding dimensional embedding vectors;
 detecting and classifying, using the alert module, malicious network behaviour in the extracted time-series features and in the dimensional embedding vectors as obtained from the data pre-processing module,
 whereby the trained encoder comprises locked-in encodings associated with the trained auto-encoder, and whereby the auto-encoder is trained, using a bootstrapping method, based on time-series features that were extracted and processed from an entire training set of data traffic, whereby the processed time-series features comprise numerical features and dimensional embedding vectors generated from tokenized categorical features using the data pre-processing module, and
 whereby the classifier neural network is initialized using time-series labelled data provided as input to the trained data pre-processing module, wherein the initialized classifier neural network is subsequently trained using static labels for labelled data and dynamically generated labels for unlabelled data,
 wherein the bootstrapping method comprises the steps of:
 for each iteration in the training of the auto-encoder,
 reducing a L2 reconstruction loss between an output of the auto-encoder and a fixed copy of input time-series comprising numerical features and learnable embeddings of categorical features.

11. The method according to claim 10 wherein the auto-encoder comprises Multi-Layered Perceptrons (MLP), Convolutional Neural Networks (CNN), Recurrent Neural Networks (RNN) or any combination thereof.

12. The method according to claim 10 wherein the locked-in encodings associated with the trained encoder comprise fixed encodings generated as a result of the auto-encoder being trained.

13. The method according to claim 10 wherein the tokenizing of the categorical features from the extracted time-series features comprises:
 assigning, using the data pre-processing module, unique integer values to each unique categorical feature in the entire set of extracted time-series.

14. The method according to claim 10 wherein the tokenizing of the categorical features from the extracted time-series features comprises:
 assigning, using the data pre-processing module, unique integer values to each occurrence of the categorical feature in each extracted time-series.

15. The method according to claim 10 wherein the conversion of tokens to dimensional embeddings comprises:
 assigning, using the data pre-processing module, dimensional embeddings for each unique token in the time series.

16. The method according to claim 10 wherein the initialization of the classifier neural network comprises:
 training, using the alert module, the classifier neural network using a supervised learning technique, the training being based on the labelled time-series data provided to the input of the trained data pre-processing module.

17. The method according to claim 10 wherein the training of the initialized classifier neural network using static labels for labelled data and dynamically generated labels for unlabelled data comprises:
 computing, using the alert module, confidence scores for each threat type in the labelled data;
 generating, using the alert module, a threshold value for each threat type based on the computed confidence scores for each threat in the labelled data;
 dynamically labelling, using the alert module, the unlabelled data using the generated threshold values for each of the threat types; and
 training, using the alert module, the initialized classifier neural network using the labelled and dynamically labelled data.

18. The method according to claim 10 further comprising the step of:
 detecting, using the alert module, potential malicious network activities in data traffic by using a static or a dynamically computed threshold that is based on recent network traffic data and alerts.

19. A system for detecting potential malicious network activities in data traffic, the system comprising:
 at least one memory;
 a data pre-processing module, implemented on the at least one memory, configured to:
 extract time-series features from a set of traffic data;
 tokenize categorical features from the extracted time-series features and embed the tokenized features into corresponding dimensional embedding vectors;
 an alert module, implemented on the at least one memory, communicatively connected to an output of the data pre-processing module, the alert module comprising a trained auto-encoder having a trained encoder with an output coupled to a trained classifier neural network, the alert module being configured to:
 detect and classify malicious network behaviour in the extracted time-series features and in the dimensional embedding vectors as obtained from the data pre-processing module,
 whereby the trained encoder comprises locked-in encodings associated with the trained auto-encoder, and whereby the auto-encoder is trained, using a bootstrapping method, based on time-series features that were extracted and processed from an entire training set of data traffic, whereby the processed time-series features comprise numerical features and dimensional embedding vectors generated from tokenized categorical features using the data pre-processing module, and
 whereby the classifier neural network is initialized using time-series labelled data provided as input to the trained data pre-processing module, wherein the initialized classifier neural network is subsequently trained using static labels for labelled data and dynamically generated labels for unlabelled data,
 wherein the training of the initialized classifier neural network using static labels for labelled data and dynamically generated labels for unlabelled data comprises the alert module being configured to:
 compute confidence scores for each threat type in the labelled data;
 generate a threshold value for each threat type based on the computed confidence scores for each threat in the labelled data;

dynamically label the unlabelled data using the generated threshold values for each of the threat types; and train the initialized classifier neural network using the labelled and dynamically labelled data.

20. A method for detecting potential malicious network activities in data traffic using a system comprising a data pre-processing module and an alert module communicatively connected to an output of the data pre-processing module, whereby the alert module comprises a trained auto-encoder having a trained encoder with an output coupled to a trained classifier neural network, the method comprising:

extracting, using the data pre-processing module, time-series features from a set of traffic data;

tokenizing, using the data pre-processing module, categorical features from the extracted time-series features and embedding the tokenized features into corresponding dimensional embedding vectors;

detecting and classifying, using the alert module, malicious network behaviour in the extracted time-series features and in the dimensional embedding vectors as obtained from the data pre-processing module, whereby the trained encoder comprises locked-in encodings associated with the trained auto-encoder, and whereby the auto-encoder is trained, using a bootstrapping method, based on time-series features that were extracted and processed from an entire training set of data traffic, whereby the processed time-series features comprise numerical features and dimensional embedding vectors generated from tokenized categorical features using the data pre-processing module, and whereby the classifier neural network is initialized using time-series labelled data provided as input to the trained data pre-processing module, wherein the initialized classifier neural network is subsequently trained using static labels for labelled data and dynamically generated labels for unlabelled data, wherein the training of the initialized classifier neural network using static labels for labelled data and dynamically generated labels for unlabelled data comprises:

computing, using the alert module, confidence scores for each threat type in the labelled data;

generating, using the alert module, a threshold value for each threat type based on the computed confidence scores for each threat in the labelled data;

dynamically labelling, using the alert module, the unlabelled data using the generated threshold values for each of the threat types; and training, using the alert module, the initialized classifier neural network using the labelled and dynamically labelled data.

* * * * *